US008704478B2

(12) United States Patent
Arai

(10) Patent No.: US 8,704,478 B2
(45) Date of Patent: Apr. 22, 2014

(54) MOTOR DRIVE CIRCUIT

(75) Inventor: Takeshi Arai, Gunma (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 381 days.

(21) Appl. No.: 13/241,867

(22) Filed: Sep. 23, 2011

(65) Prior Publication Data

US 2012/0076343 A1 Mar. 29, 2012

(30) Foreign Application Priority Data

Sep. 27, 2010 (JP) ................................. 2010-215702

(51) Int. Cl.
*H02P 25/06* (2006.01)
*G05B 5/01* (2006.01)

(52) U.S. Cl.
USPC ............ 318/623; 318/621; 318/629; 318/687

(58) Field of Classification Search
USPC .......... 318/119, 135, 619–621, 623, 629, 687
See application file for complete search history.

(56) References Cited

U.S. PATENT DOCUMENTS

| 5,377,096 | A | * | 12/1994 | Ono ................................ 700/71 |
| 6,377,418 | B1 | * | 4/2002 | Kagami et al. .............. 360/78.14 |
| 6,567,230 | B1 | * | 5/2003 | Kagami et al. ................... 360/75 |
| 7,209,311 | B2 | * | 4/2007 | Ueda et al. ................. 360/77.06 |

FOREIGN PATENT DOCUMENTS

| EP | 0554125 A2 | 8/1993 |
| JP | 62054308 A | 3/1987 |
| JP | 62212983 A | 9/1987 |
| JP | 05159492 A | 6/1993 |
| JP | 2005063362 A | 3/2005 |
| JP | 2005259314 A | 9/2005 |
| JP | 2008-178206 A | 7/2008 |

OTHER PUBLICATIONS

Extended European Search Report for European Application No. 11182564.2 dated Dec. 13, 2011 (6 pages).
Patent Abstract for Japanese Publication No. 05159492 Published Jun. 25, 1993 (1 page).
Patent Abstract for Japanese Publication No. 62212983 Published Sep. 18, 1987 (1 page).
espacenet; Patent Abstract for Japanese Publication No. 62-54308 Published Mar. 10, 1987 (1 page).

(Continued)

*Primary Examiner* — Bentsu Ro
(74) *Attorney, Agent, or Firm* — Polansky & Associates, P.L.L.C.; Paul J. Polansky

(57) ABSTRACT

A motor-drive circuit includes: a filter circuit to attenuate a frequency band including a resonance frequency of an actuator in a target-current signal, which is a digital signal indicating a target value of a driving current to be supplied to a voice-coil motor that drives the actuator; a digital-analog converter to convert an output signal of the filter circuit into an analog signal, to be outputted as a current-control signal; and a driving circuit to supply the driving current to the motor in accordance with the current-control signal, the filter circuit including: a digital-notch filter to attenuate a frequency band around the resonance frequency in the target-current signal; and a digital-low-pass filter to attenuate a frequency band greater than or equal to a predetermined frequency in the output signal of the digital-notch filter, the digital-low-pass filter having a sampling frequency higher than a sampling frequency of the digital-notch filter.

12 Claims, 10 Drawing Sheets

(56) References Cited

OTHER PUBLICATIONS

Patent Abstract for Japanese Publication No. 2005063362 Published Mar. 5, 2010 (1 page).

Patent Abstract for Japanese Publication No. 2005259314 Published Sep. 22, 2005 (1 page).

* cited by examiner

MOTOR DRIVE CIRCUIT

CROSS-REFERENCE TO RELATED APPLICATION

This application claims the benefit of priority to Japanese Patent Application No. 2010-215702, filed Sep. 27, 2010, of which full contents are incorporated herein by reference.

BACKGROUND OF THE INVENTION

1. Field of the Invention

The present invention relates to a motor drive circuit.

2. Description of the Related Art

With respect to a linear motor configured to drive an actuator to perform positioning of a magnetic head of a hard disc drive, a voice coil motor is generally known that produces thrust by passing an electric current through a coil in a magnetic field of a permanent magnet. Recently, there have been portable terminals such as cellular phones and notebook personal computers equipped with camera modules in which the voice coil motors may be used to perform auto-focusing control and optical zoom control in order to reduce the sizes of the modules.

For example, Japanese Patent Laid-Open Publication No. 2008-178206 discloses an actuator drive device capable of reducing vibration of a movable part by changing a drive current of the voice coil motor at a certain gradient in a time period which is a substantially natural-number multiple of the natural frequency period of the movable part.

As such, the position of the movable part of the actuator can swiftly be stabilized by supplying to the voice coil motor the drive current having a ramp waveform which changes at a certain gradient.

The natural frequency period, however, varies with the configuration of the actuator, and the actuator drive device of Japanese Patent Laid-Open Publication No. 2008-178206 requires that the time period in which the drive current is ramped up should be set longer as the natural frequency (resonance frequency) becomes lower.

For this reason, the convergence time, in which the vibration of the actuator has converged and the position of the moving part has been stabilized, may become longer, so that the response speed required for the module to be used may not be satisfied.

SUMMARY OF THE INVENTION

A motor drive circuit according to an aspect of the present invention, includes: a filter circuit configured to attenuate a frequency band including a resonance frequency of an actuator in a target current signal, the target current signal being a digital signal indicating a target value of a driving current to be supplied to a voice coil motor configured to drive the actuator; a digital-analog converter configured to convert an output signal of the filter circuit into an analog signal, to be outputted as a current control signal; and a driving circuit configured to supply the driving current to the voice coil motor in accordance with the current control signal, the filter circuit including: a digital notch filter configured to attenuate a frequency band around the resonance frequency in the target current signal; and a digital low-pass filter configured to attenuate a frequency band greater than or equal to a predetermined frequency in the output signal of the digital notch filter, the digital low-pass filter having a sampling frequency higher than a sampling frequency of the digital notch filter.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Configuration of Motor Drive Circuit

A configuration of a motor drive circuit according to an embodiment of the present invention will be described with reference to FIGS. 1 and 2.

Figure 1:
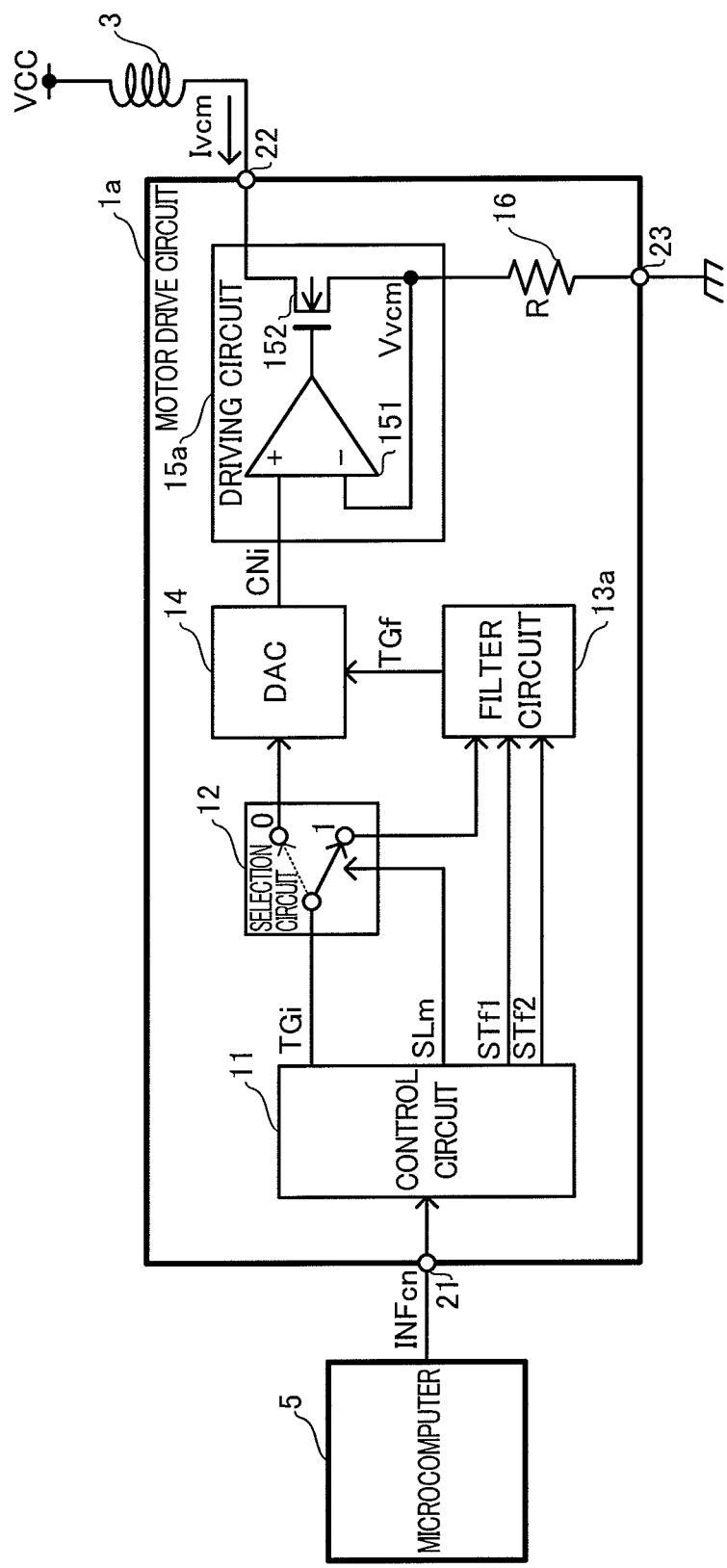
FIG. 1 is a circuit block diagram illustrating a configuration of a motor drive circuit according to an embodiment of the present invention.

A motor drive circuit 1a illustrated in FIG. 1 is a circuit configured to supply a driving current Ivcm to a voice coil motor 3 that is configured to drive an actuator under control of a microcomputer 5, and is configured as an integrated circuit provided with terminals 21 to 23. The motor drive circuit 1a includes a control circuit 11, a selection circuit 12, a filter circuit 13a, a DAC (Digital-Analog Converter) 14, a driving circuit 15a, and a resistor 16. The resistor 16 may be externally connected to the terminal 23. It is preferable that the motor drive circuit 1a is integrated to be formed on one semiconductor substrate.

Control information INFcn is inputted to the control circuit 11 from the microcomputer 5 through the terminal 21. A target current signal TGi, a mode selection signal SLm, and filter setting information STf1 and STf2 are outputted from the control circuit 11.

The selection circuit 12 is configured as a multiplexer with one input and two outputs, and the mode selection signal SLm is inputted to a selection control input. The target current signal TGi is inputted to a data input. The target current signal TGi is inputted to the DAC 14 and the filter circuit 13a from outputs corresponding to SLm=0 and 1, respectively.

Figure 2:
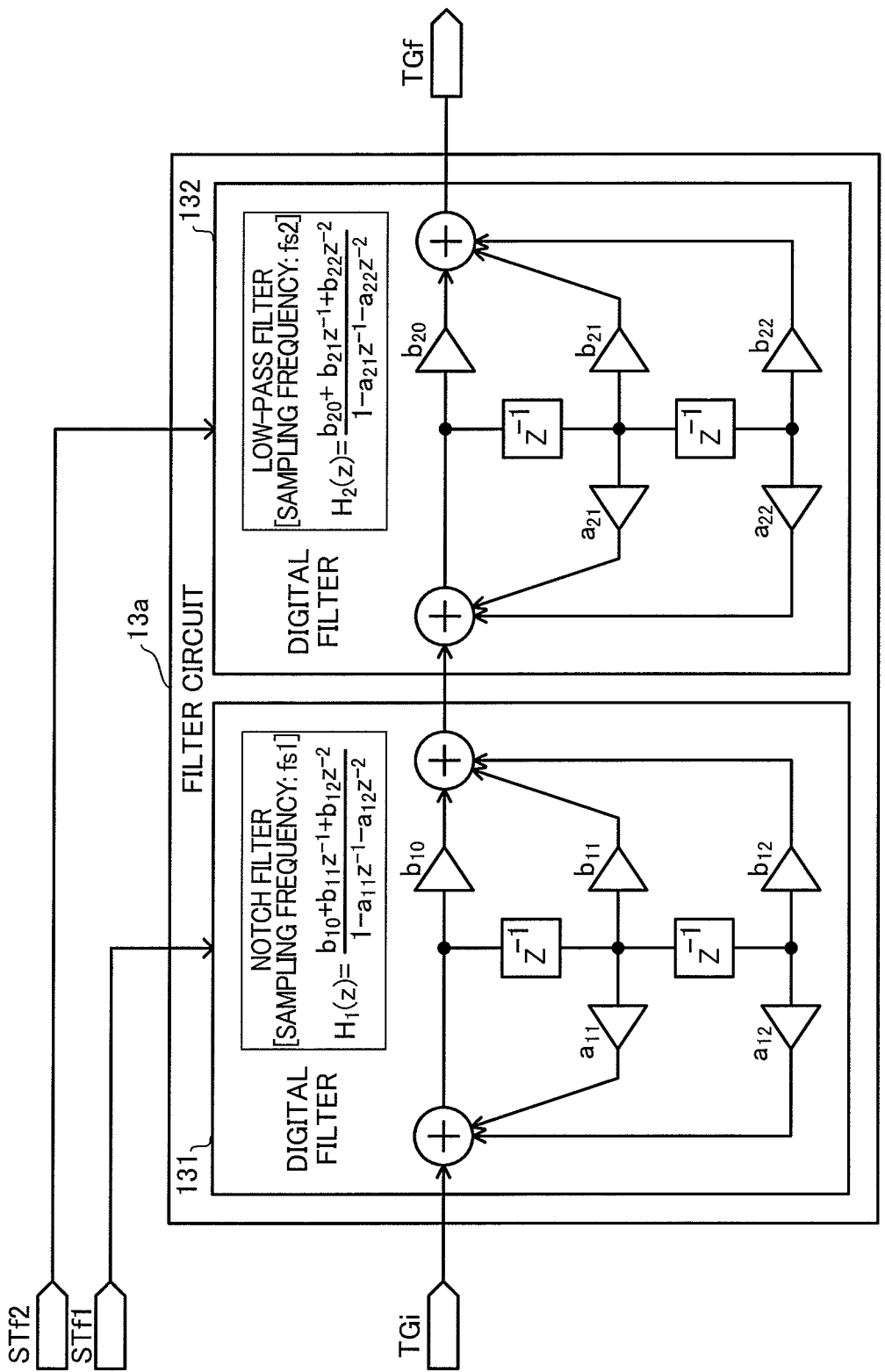
FIG. 2 is a circuit block diagram illustrating an example of a specific configuration of a filter circuit.

As illustrated in FIG. 2, the filter circuit 13a includes digital filters 131 and 132. FIG. 2 illustrates, as an example, the digital filters 131 and 132 configured as known secondary IIR (Infinite Impulse Response) filter.

The target current signal TGi and the filter setting information STf1 are inputted to the digital filter 131. An output signal of the digital filter 131 and the filter setting information STf2 are inputted to the digital filter 132, and the (filtered) target current signal TGf is outputted from the digital filter 132. The target current signals TGi and TGf are inputted to the DAC 14, and the current control signal CNi is outputted from the DAC 14.

The driving circuit 15a includes an Op-Amp (Operational Amplifier) 151 and an NMOS (N-channel Metal-Oxide Semiconductor) transistor 152, for example. The current control signal CNi is inputted to a non-inverting input of the operational amplifier 151, and an inverting input is connected to a source of the NMOS transistor 152. Further, a drain of the NMOS transistor 152 is connected to the terminal 22, a source thereof is connected to the terminal 23 through the resistor 16, and an output signal of the operational amplifier 151 is inputted to a gate thereof. The voice coil motor 3 with one end connected to the power supply potential VCC is connected to the terminal 22, and the terminal 23 is connected to a ground potential.

Operation of Motor Drive Circuit

Subsequently, an operation of the motor drive circuit according to an embodiment of the present invention will be described.

The control circuit 11 is configured to output the target current signal TGi, the mode selection signal SLm, and the filter setting information STf1 and STf2 on the basis of the control information INFcn that is inputted from the microcomputer 5.

Here, the target current signal TGi is a digital signal indicating a target value of a driving current Ivcm that is supplied to the voice coil motor 3. The mode selection signal SLm is a signal to select a measurement mode (first mode) or a control mode (second mode), which will be described later. With regard to the mode selection signal SLm, it is assumed that SLm=0 indicates the measurement mode and SLm=1 indicates the control mode.

Further, the filter setting information STf1 and STf2 are information to set characteristics of the digital filters 131 and 132, respectively. Specifically, the filter setting information STf1 is information to set a coefficient or a sampling frequency with which the digital filter 131 functions as a notch filter. On the other hand, the filter setting information STf2 is information to set the coefficient or the sampling frequency with which the digital filter 132 functions as a low-pass filter.

The selection circuit 12 is configured to supply the target current signal TGi that is inputted from the control circuit 11 to the DAC 14 when SLm=0 (measurement mode), and to supply the target current signal TGi to the filter circuit 13a when SLm=1 (control mode).

The digital filter 131 of the filter circuit 13a is configured to attenuate the frequency band, which is determined in accordance with the coefficient set by the filter setting information STf1, in the target current signal TGi. More specifically, the digital filter 131 is configured to function as a notch filter and attenuate the frequency band around a frequency fc1. The digital filter 132 is configured to attenuate the frequency band that is determined in accordance with the coefficient set by the filter setting information STf2 in the output signal of the digital filter 131. More specifically, the digital filter 132 is configured to function as a low-pass filter, attenuate the frequency band greater than or equal to the frequency fc2, and output the (filtered) target current signal TGf.

The DAC 14 is configured to convert the target current signal TGi (when SLm=0) or TGf (when SLm=1) into an analog signal, and generate the current control signal CNi. The operational amplifier 151 is configured to compare the voltage of the current control signal CNi with the voltage Vvcm at a connection point of the NMOS transistor 152 and the resistor 16, and moreover the gate voltage of the NMOS transistor 152 changes in accordance with the comparison result.

Here, assuming that the resistance value of the resistor 16 is R, the driving current Ivcm is detected as the voltage Vvcm=Ivcm×R. Therefore, the driving circuit 15a is configured to control the voltage Vvcm so as to become equal to the voltage of the current control signal CNi, and the current value of the driving current Ivcm is controlled so as to become a current value indicated by the current control signal CNi.

As such, the motor drive circuit 1a converts the target current signal TGi in the measurement mode and the target current signal TGf in the control mode into analog signals, respectively, to generate the current control signal CNi. Then, the circuit supplies the driving current Ivcm to the voice coil motor 3 in accordance with the current control signal CNi.

Specific Examples of Operations of Motor Drive Circuit and Actuator

Here, specific examples of operations of the motor drive circuit and the actuator in the measurement mode and the control mode will be described.

First, with reference to FIG. 3, an operation in the measurement mode will be described. The measurement mode is a mode in which a resonance frequency fr of the actuator driven by the voice coil motor 3 is measured.

In the measurement mode, the control circuit 11 outputs a step signal as the target current signal TGi on the basis of the control information INFcn. The target current signal TGi is supplied to the DAC 14 through the selection circuit 12, and is converted into an analog signal. Therefore, as illustrated in a short broken line in FIG. 3, the voltage of the current control signal CNi changes in a stepped manner.

Figure 3:
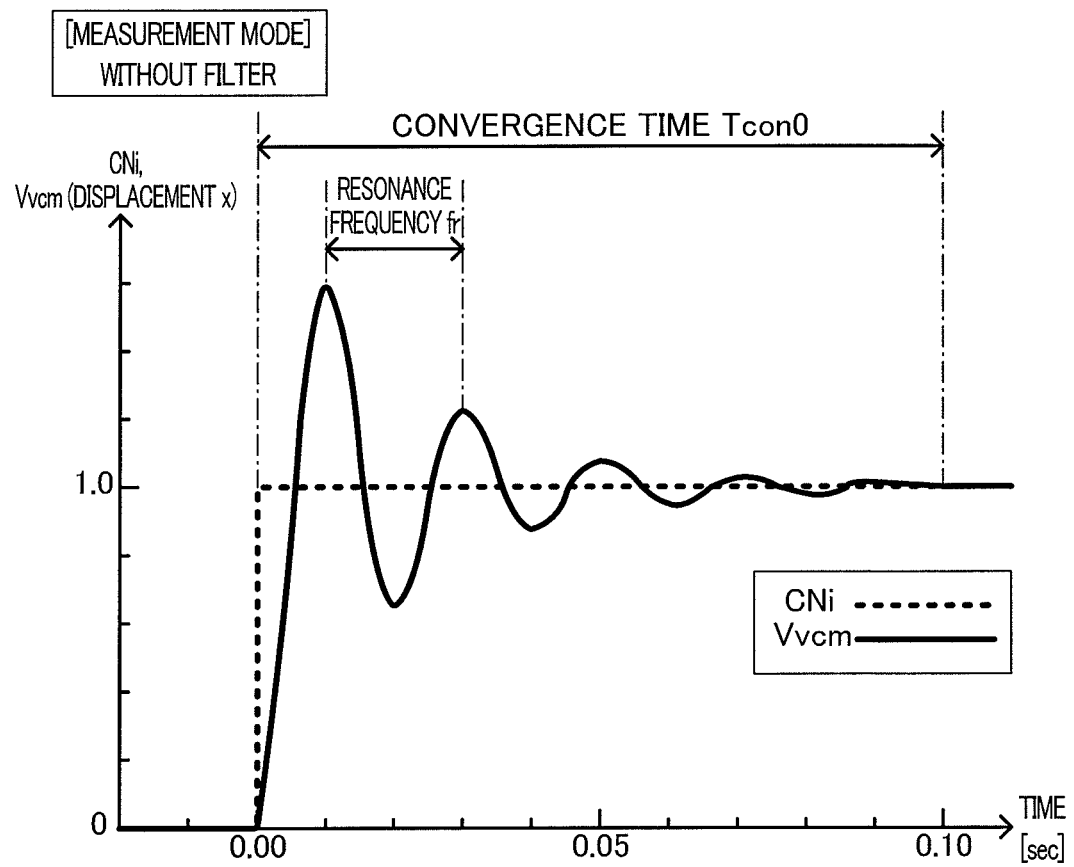
FIG. 3 is a schematic diagram illustrating an example of a relationship between a current control signal CNi and a voltage Vvcm in a measurement mode.

In this case, the driving circuit 15a controls the voltage Vvcm so as to become equal to the step voltage of the current control signal CNi, but the voltage Vvcm oscillates due to an inertial force of a movable part of the actuator and a recovering force of a spring as indicated by a solid line in FIG. 3, and then gradually converges. Also, the actuator similarly vibrates, and displacement x of the movable part gradually converges to a target position corresponding to the target current signal TGi. Then, the displacement x is measured and the measurement data is spectrally analyzed, so as to obtain the resonance frequency fr. By measuring the driving current Ivcm or the voltage Vvcm, the resonance frequency fr may be acquired from the measurement data.

Subsequently, an operation in the control mode will be described with reference to FIGS. 4 to 7 as appropriate. The control mode is a mode in which the actuator is driven under control of the microcomputer 5.

In the control mode, the control circuit 11 outputs the target current signal TGi, which changes in a stepped manner in accordance with the target position of the movable part of the actuator, on the basis of the control information INFcn. Hereinafter, a description will be given of a case where the same step signal as in the measurement mode is outputted as the target current signal TGi, for the purpose of comparison with the operation in the measurement mode.

The target current signal TGi is supplied to the DAC 14 as the target current signal TGf through the selection circuit 12 and the filter circuit 13a, to be converted into an analog signal. Therefore, in the control mode, the driving circuit 15a supplies the driving current Ivcm to the voice coil motor 3 in accordance with the current control signal CNi which has been filtered by the filter circuit 13a.

As described above, the frequency bands to be attenuated by the digital filters 131 and 132 of the filter circuit 13a are determined in accordance with the coefficients set by the filter setting information STf1 and STf2, respectively.

Figure 4:
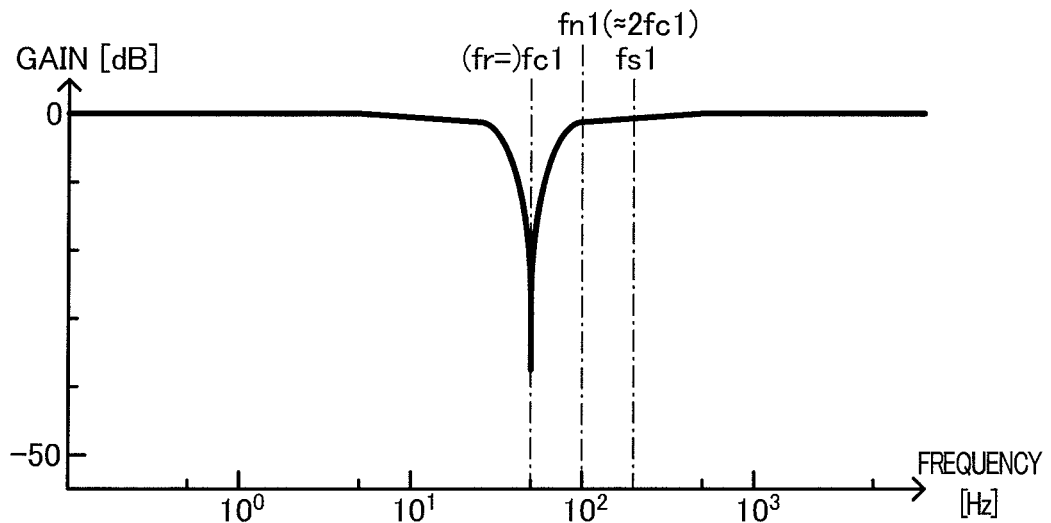
FIG. 4 is a schematic diagram illustrating an example of a notch filter used in a digital filter 131 in a control mode.

FIG. 4 illustrates an example of frequency characteristics of the digital filter 131 for which the coefficient or a sampling frequency fs1 is set such that the filter functions as a notch filter. The notch filter attenuates the frequency band around the frequency fc1 which is equal to the resonance frequency fr measured in advance in the measurement mode.

Here, the sampling frequency fs1 is required to be set such that a Nyquist frequency fn1 (=fs1/2) becomes higher than the frequency fc1. On the other hand, from the viewpoint of the characteristics (symmetry of gain and the like) of the frequencies around the frequency fc1, it is not preferable that the sampling frequency fs1 becomes too high. Further, since the oscillation in the step response as illustrated in FIG. 3 also contains a frequency component of odd multiple of the resonance frequency fr, the sampling frequency fs1 is set such that the Nyquist frequency fn1 becomes approximately twice the frequency fc1 in an embodiment of the present invention.

Figure 5:
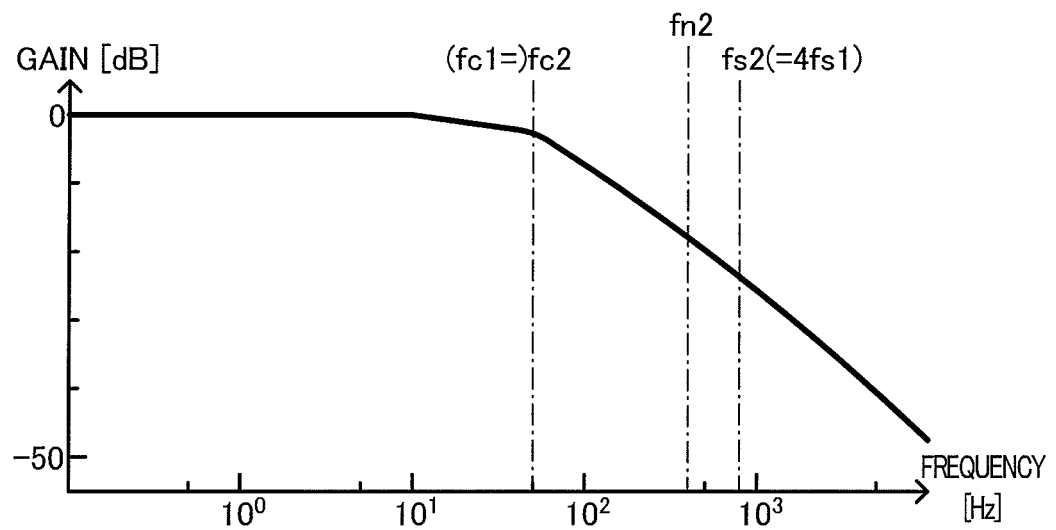
FIG. 5 is a schematic diagram illustrating an example of a low-pass filter used in a digital filter 132 in a control mode.

FIG. 5 illustrates an example of frequency characteristics of the digital filter 132 for which the coefficient and a sampling frequency fs2 are set such that the filter functions as a low-pass filter. This low-pass filter attenuates the frequency band greater than or equal to the predetermined frequency fc2. In an embodiment of the present invention, the frequency fc2 is set so as to become equal to the frequency fc1, for example.

Here, the sampling frequency fs2 is required to be set such that the Nyquist frequency fn2 (=fs2/2) becomes higher than the frequency fc2. Further, the sampling frequency fs2 is required to be set so as to become higher than the sampling frequency fs1 of the digital filter 131, and preferably, it is set so as to become n times (n is an integer greater than 2) the sampling frequency fs1. In an embodiment of the present invention, the sampling frequency fs2 is set so as to become 4 times the sampling frequency fs1 as an example.

Figure 6:
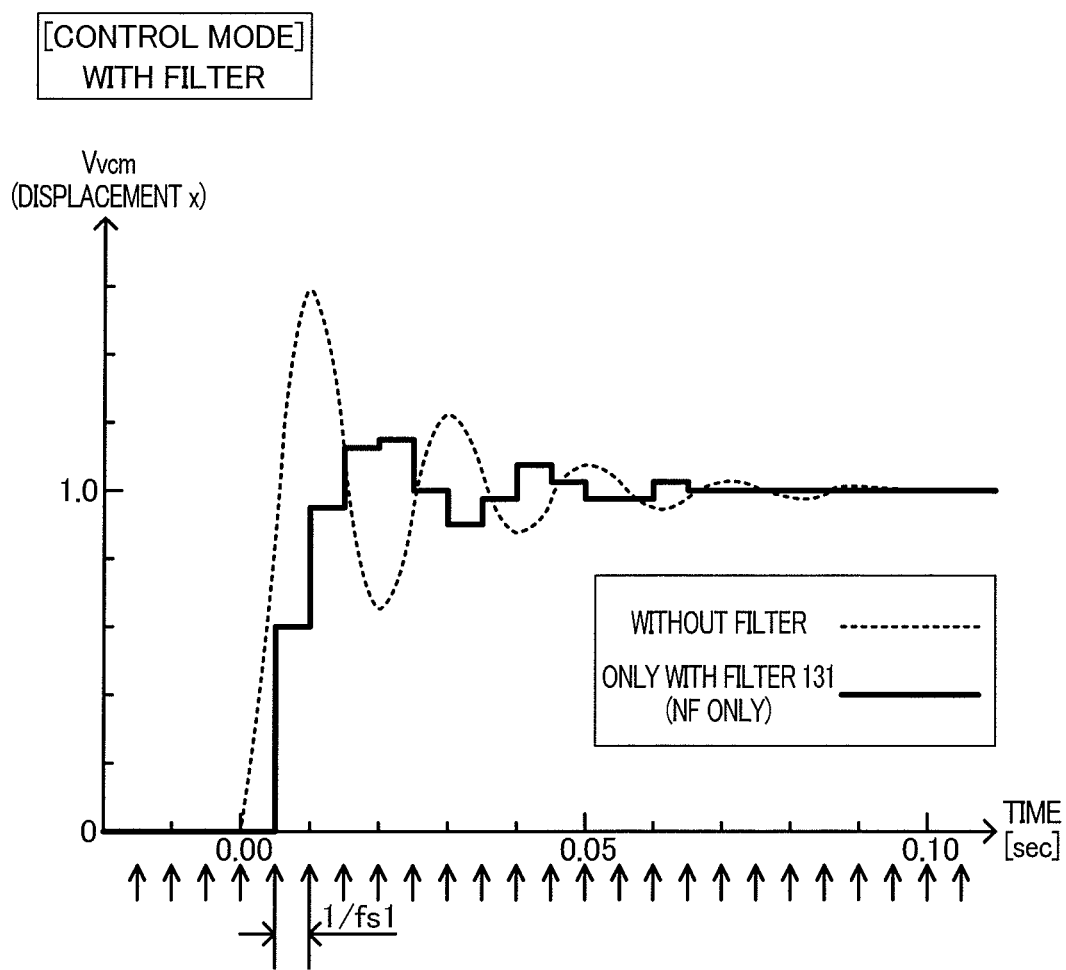
FIG. 6 is a schematic diagram illustrating an example of a voltage Vvcm in a case where only a notch filter illustrated in FIG. 4 is used.

FIG. 6 illustrates an example of the voltage Vvcm in a case of using only the notch filter illustrated in FIG. 4. Also, in FIG. 6, the voltage Vvcm in the measurement mode (solid line in FIG. 3) is indicated by a short broken line for comparison purposes.

As described above, since the sampling frequency fs1 cannot be set sufficiently high from the viewpoint of the frequency characteristics, the driving waveform of the driving circuit 15a results in a stepped shape, as illustrated in FIG. 6. In an embodiment of the present invention, a change in a stepped manner is smoothed by using the low-pass filter with higher sampling frequency in combination.

Figure 7:
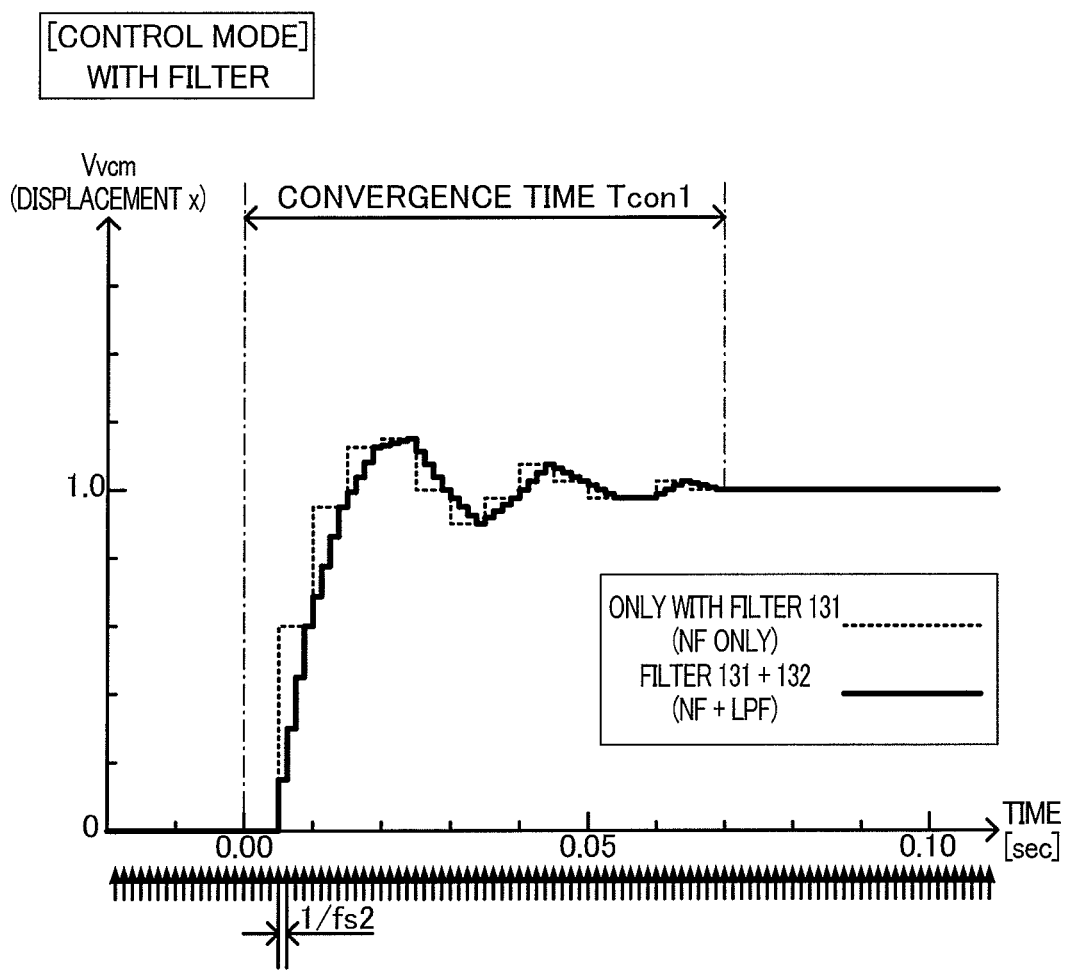
FIG. 7 is a schematic diagram illustrating an example of a voltage Vvcm in a case where a low-pass filter illustrated in FIG. 5 is further used.

FIG. 7 illustrates an example of the voltage Vvcm in a case where the low-pass filter illustrated in FIG. 5 is further used. Also, in FIG. 7, the voltage Vvcm (solid line in FIG. 6) in a case where only the notch filter is used is indicated by a short broken line for the purpose of comparison.

As described above, since the sampling frequency fs2 is four times the sampling frequency fs1, the driving waveform of the driving circuit 15a is smoothed by the low-pass filter, so that the change is smoothed, as illustrated in FIG. 7. Moreover, an input signal inputted to the low-pass filter has the frequency band around the resonance frequency fr already attenuated by the notch filter, and thus a convergence time Tcon1, which is a time period until the oscillation has converged, is reduced as compared with a convergence time Tcon0 in the measurement mode (FIG. 3).

As such, by filtering the target current signal TGi with the digital filters 131 and 132, the vibration of the actuator is suppressed, and the convergence time, which is a time period until the oscillation has converged, can be reduced.

Another Configuration Example of Motor Drive Circuit

Figure 8:
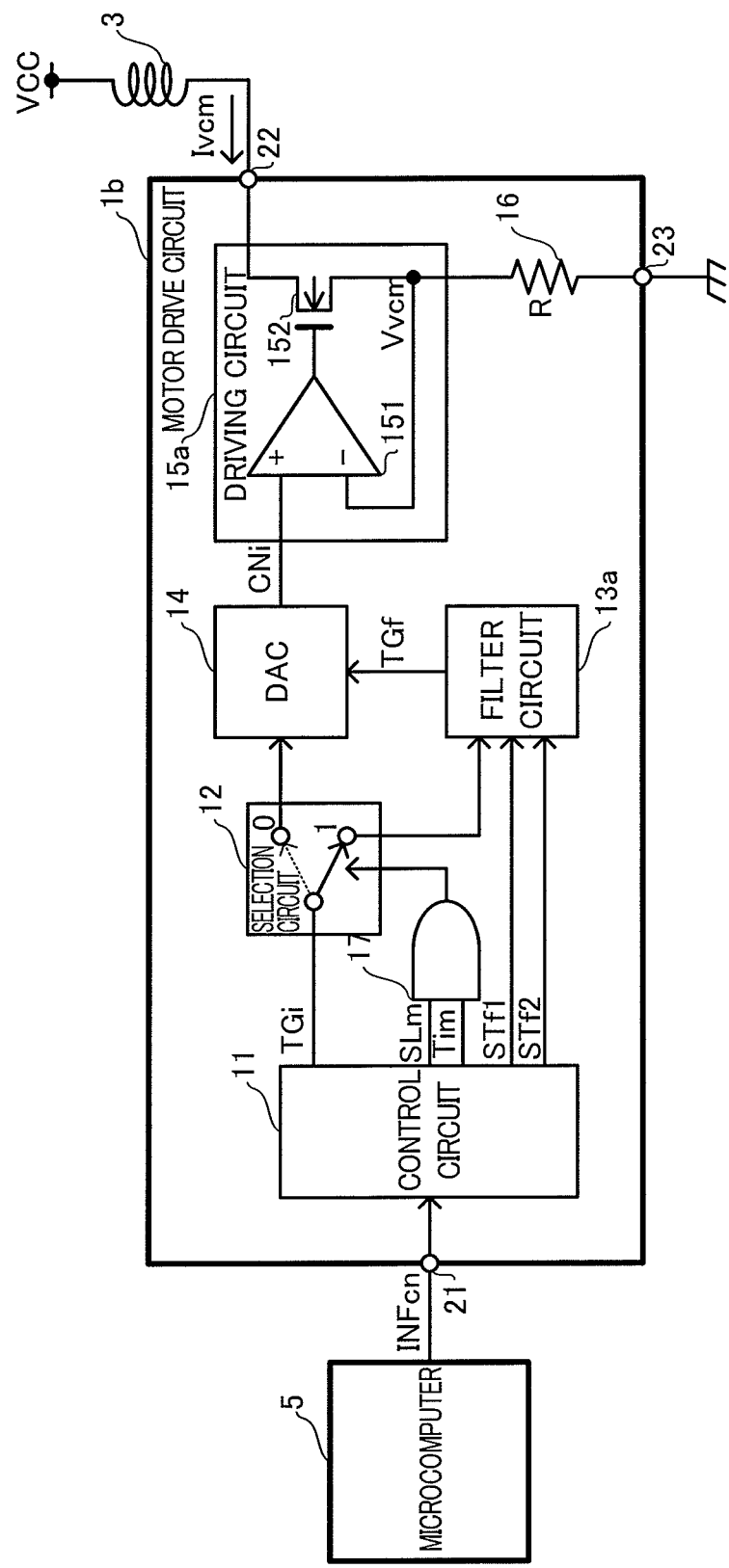
FIG. 8 is a circuit block diagram illustrating another configuration example of a motor drive circuit.

In an embodiment of the present invention, the motor drive circuit 1a filters the target current signal TGi all the time by the filter circuit 13a in the control mode, but it is not limited thereto. For example, as illustrated in FIG. 8, it may be so configured that a timing signal Tim is further outputted from the control circuit 11 and an output signal of an AND circuit (logical product circuit) 17, to which the mode selection signal SLm and the timing signal Tim are inputted, is inputted to the selection control input of the selection circuit 12.

Figure 9:
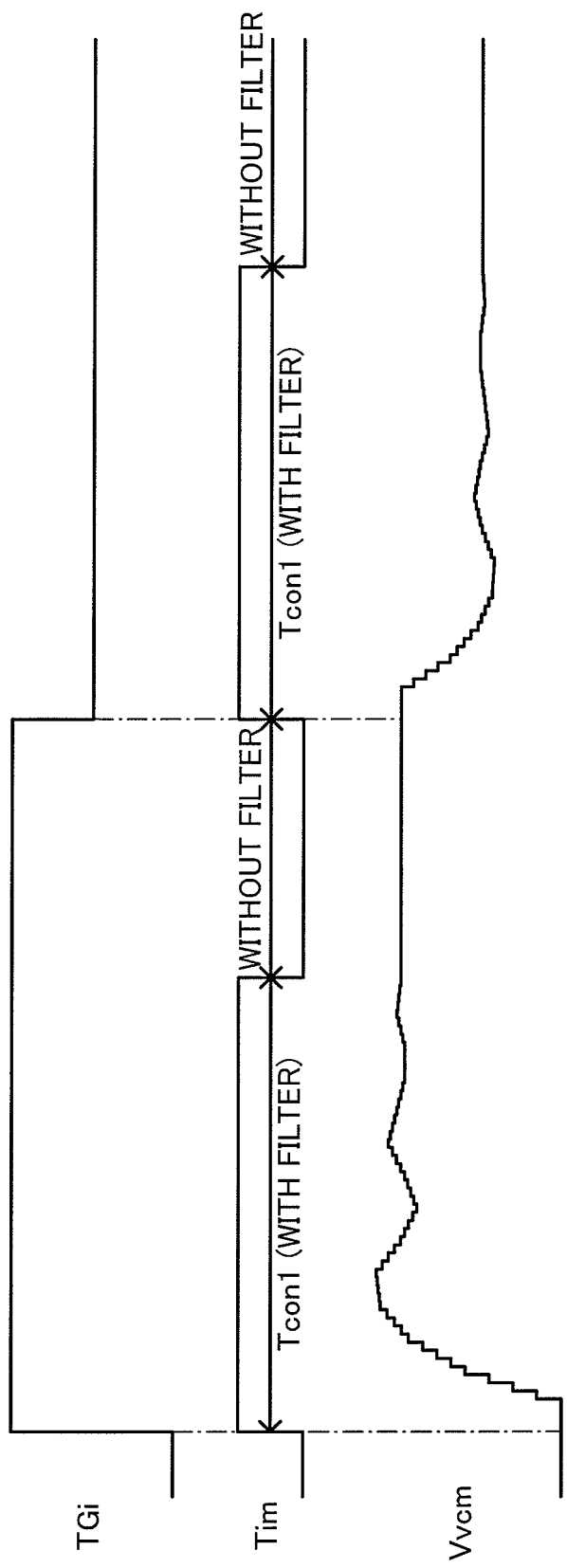
FIG. 9 is a diagram for describing an operation of a motor drive circuit illustrated in FIG. 8.

In this case, for example, as illustrated in FIG. 9, every time the target current signal TGi is changed in the stepped manner, the timing signal Tim goes high (to a high level) only for a predetermined period, and the target current signal TGi is filtered. Also, the length of the predetermined period can be set to that of the convergence time Tcon1. Therefore, after the convergence time Tcon1 has elapsed, fluctuation of the driving waveform of the driving circuit 15a can be prevented, which is caused by a rounding error or the like of the digital filter.

Figure 10:
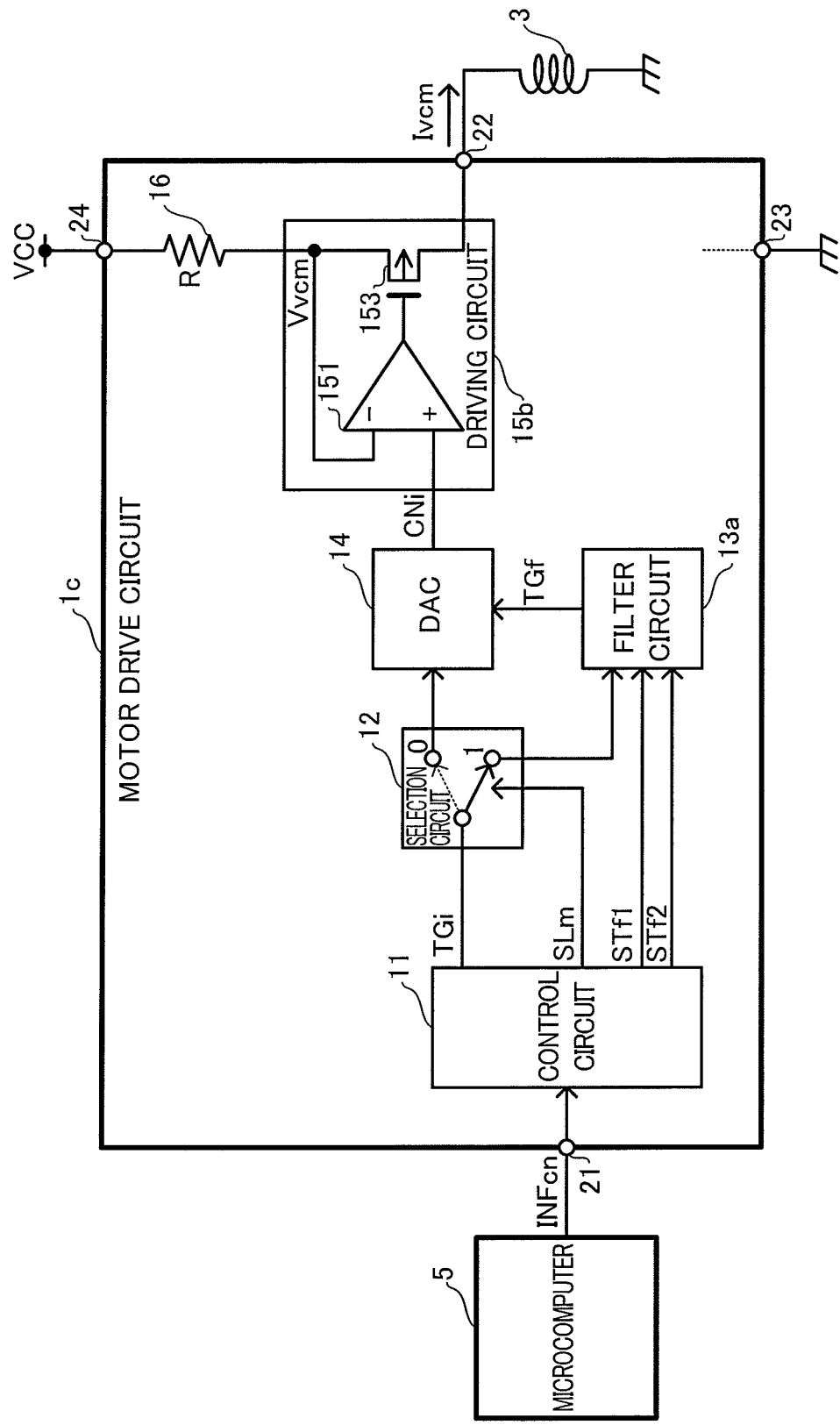
FIG. 10 is a circuit block diagram illustrating another configuration example of a motor drive circuit.

In an embodiment of the present invention, the driving circuit 15a of the motor drive circuit 1a controls the driving current Ivcm using the NMOS transistor 152, but it is not limited thereto. For example, as illustrated in FIG. 10, it may be so configured that the power supply potential VCC and the ground potential are inverted in polarity by using the PMOS (P-channel MOS: P-channel Metal-Oxide Semiconductor) transistor 153.

In the motor drive circuit 1a, a large current flows if the voice coil motor 3 is short-circuited to the ground potential, but the motor drive circuit 1c illustrated in FIG. 10 is configured such that a large current does not flow when short circuit to the ground potential occurs. Also, in the motor drive circuit 1c, a large current flows if the voice coil motor 3 is short-circuited to the power supply potential VCC, however, since a terminal or wiring of the power supply potential VCC is usually arranged not around the voice coil motor 3, short circuit to the power supply potential VCC hardly occurs. Further, by setting the terminal 23 of the motor drive circuit 1c and one end of the voice coil motor 3 at the common ground potential, wiring can be simplified.

On the other hand, in the motor drive circuit 1a, the transistor can be reduced in size as compared with the PMOS transistor 153 by using the NMOS transistor 152.

Another Configuration Example of Filter Circuit

In an embodiment of the present invention, the filter circuit 13a is configured using the two cascade-connected digital filters 131 and 132, but it is not limited thereto. For example, as illustrated in FIG. 11, the circuit can be configured using a time-division controlled single digital filter 133.

Figure 11:
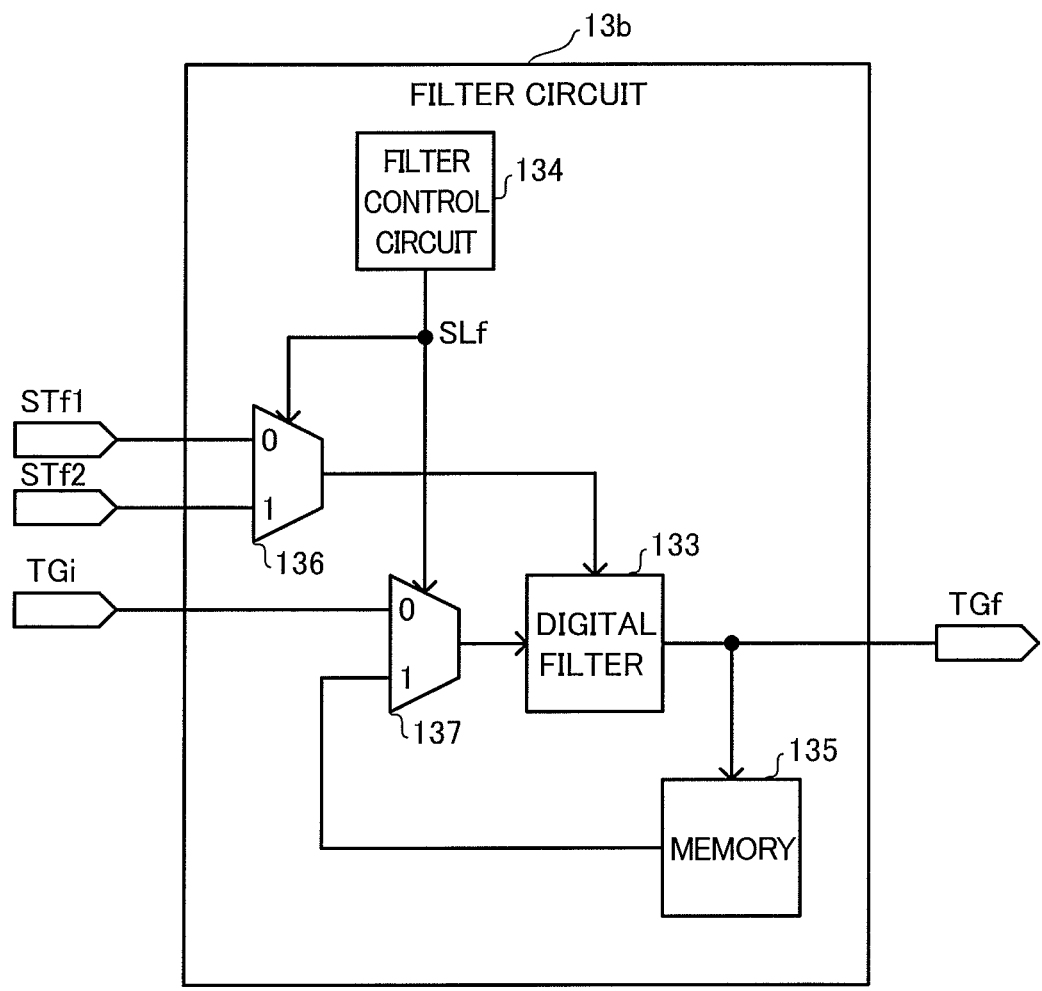
FIG. 11 is a circuit block diagram illustrating another configuration example of a filter circuit.

The filter circuit 13b illustrated in FIG. 11 includes the digital filter 133, a filter control circuit 134, a memory 135, and multiplexers (selection circuits) 136 and 137. Also, the multiplexer 136 selects the filter setting information STf1 or STf2 in a time division manner in accordance with a filter selection signal SLf outputted from the filter control circuit 134. Further, the multiplexer 137 selects the target current signal TGi or an output signal of the digital filter 133 which is stored in the memory 135 in a time division manner in accordance with the filter selection signal SLf.

As such, during a first period when SLf=0, the digital filter 133 can be caused to function as a notch filter, which is similar to the digital filter 131 whereto the target current signal TGi is inputted. On the other hand, during a second period when SLf=1, the digital filter 133 can be caused to function as a low-pass filter, which is similar to the digital filter 132 whereto an output signal of the notch filter is inputted.

As described above, in the motor drive circuit 1a, the frequency band around the resonance frequency fr of the actuator in the target current signal TGi is attenuated by the digital (notch) filter 131 with the sampling frequency fs1, and further, the frequency band greater than or equal to the predetermined frequency is attenuated to be smoothed by the digital (low-pass) filter 132 with the sampling frequency fs2 (>fs1), and the driving current Ivcm is supplied to the voice coil motor 3 in accordance with the filtered current control signal CNi, thereby being able to reduce the convergence time, which is a time period until the oscillation has converged, regardless of the resonance frequency of the actuator.

Further, by setting the sampling frequency fs2 at a value of n times (n is an integer greater than 2) the sampling frequency fs1, the change in a stepped manner of the driving waveform of the driving circuit 15a can be smoothed. Moreover, the sampling frequencies fs1 and fs2 can be generated one from the other by using a frequency division circuit or a multiplication circuit.

Furthermore, in the measurement mode, by supplying the step signal to the DAC 14 as the target current signal TGi and by measuring the resonance frequency fr of the oscillation in the step response in advance, the frequency band to be attenuated by the filter circuit 13a can be set in accordance with the measured resonance frequency fr, in the control mode.

Furthermore, every time the target current signal TGi changes in a stepped manner, by filtering the target current signal TGi only for the convergence time Tcon1, fluctuation of the driving waveform of the driving circuit 15a can be prevented, which is caused by a rounding error of the digital filter, after the convergence time Tcon1 has elapsed.

Furthermore, by using the digital filter 133 under time-division control, the functions of the cascade-connected notch filter and low-pass filter can be realized by a single digital filter, thereby being able to reduce the circuit size.

In an embodiment as described above, the resonance frequency fr of the actuator which is driven by the voice coil motor 3 is measured in the measurement mode, an embodiment according to the present invention is not limited thereto and may not be required to have the measurement mode.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit comprising:
a filter circuit configured to attenuate a frequency band including a resonance frequency of an actuator in a target current signal, the target current signal being a digital signal indicating a target value of a driving current to be supplied to a voice coil motor configured to drive the actuator;
a digital-analog converter configured to convert an output signal of the filter circuit into an analog signal, to be outputted as a current control signal; and
a driving circuit configured to supply the driving current to the voice coil motor in accordance with the current control signal,
the filter circuit including:
a digital notch filter configured to attenuate a frequency band around the resonance frequency in the target current signal; and
a digital low-pass filter configured to attenuate a frequency band greater than or equal to a predetermined frequency in the output signal of the digital notch filter,
the digital low-pass filter having a sampling frequency higher than a sampling frequency of the digital notch filter.

2. The motor drive circuit according to claim 1, wherein the sampling frequency of the digital low-pass filter is n times (n is an integer greater than 2) the sampling frequency of the digital notch filter.

3. The motor drive circuit according to claim 2, further comprising:
a selection circuit to which a step signal is inputted as the target current signal in accordance with a mode selection signal, the selection circuit configured to select a first mode in which the step signal is supplied to the digital-analog converter or a second mode in which the inputted target current signal is supplied to the filter circuit, wherein
the digital-analog converter is configured to convert the step signal into an analog signal, to be outputted as the current control signal, in the first mode; and
the filter circuit has the frequency band to be attenuated set therefor in accordance with the resonance frequency measured in advance in the first mode, in the second mode.

4. The motor drive circuit according to claim 3, wherein the selection circuit is configured to supply the target current signal to the filter circuit only for a predetermined period every time the target current signal changes in a stepped manner, in the second mode.

5. The motor drive circuit according to claim 4, wherein the filter circuit includes:
a digital filter configured to function as the digital notch filter or the digital low-pass filter;
a selection circuit configured to select a coefficient, a sampling frequency, and an input signal of the digital filter in a time division manner; and
a memory configured to store an output signal of the digital filter, wherein
the selection circuit is configured to select the coefficient and the sampling frequency so that the digital filter functions as the digital notch filter, and supply the target current signal to the digital filter, in the first period; and
the selection circuit is configured to select the coefficient and the sampling frequency so that the digital filter functions as the digital low-pass filter, and supply the signal stored in the memory in the first period to the digital filter, in the second period.

6. The motor drive circuit according to claim 2, wherein the filter circuit includes:
a digital filter configured to function as the digital notch filter or the digital low-pass filter;
a selection circuit configured to select a coefficient, a sampling frequency, and an input signal of the digital filter in a time division manner; and
a memory configured to store an output signal of the digital filter, wherein the selection circuit is configured to select the coefficient and the sampling frequency so that the digital filter functions as the digital notch filter, and supply the target current signal to the digital filter, in the first period; and the selection circuit is configured to select the coefficient and the sampling frequency so that the digital filter functions as the digital low-pass filter, and supply the signal stored in the memory in the first period to the digital filter, in the second period.

7. The motor drive circuit according to claim 3, wherein the filter circuit includes:
   a digital filter configured to function as the digital notch filter or the digital low-pass filter;
   a selection circuit configured to select a coefficient, a sampling frequency, and an input signal of the digital filter in a time division manner; and
   a memory configured to store an output signal of the digital filter, wherein
the selection circuit is configured to select the coefficient and the sampling frequency so that the digital filter functions as the digital notch filter, and supply the target current signal to the digital filter, in the first period; and
the selection circuit is configured to select the coefficient and the sampling frequency so that the digital filter functions as the digital low-pass filter, and supply the signal stored in the memory in the first period to the digital filter, in the second period.

8. The motor drive circuit according to claim 1, further comprising:
   a selection circuit to which a step signal is inputted as the target current signal in accordance with a mode selection signal, the selection circuit configured to select a first mode in which the step signal is supplied to the digital-analog converter or a second mode in which the inputted target current signal is supplied to the filter circuit, wherein
   the digital-analog converter is configured to convert the step signal into an analog signal, to be outputted as the current control signal, in the first mode; and
   the filter circuit has the frequency band to be attenuated set therefor in accordance with the resonance frequency measured in advance in the first mode, in the second mode.

9. The motor drive circuit according to claim 8, wherein the selection circuit is configured to supply the target current signal to the filter circuit only for a predetermined period every time the target current signal changes in a stepped manner, in the second mode.

10. The motor drive circuit according to claim 9, wherein the filter circuit includes:
    a digital filter configured to function as the digital notch filter or the digital low-pass filter;
    a selection circuit configured to select a coefficient, a sampling frequency, and an input signal of the digital filter in a time division manner; and
    a memory configured to store an output signal of the digital filter, wherein
the selection circuit is configured to select the coefficient and the sampling frequency so that the digital filter functions as the digital notch filter, and supply the target current signal to the digital filter, in the first period; and
the selection circuit is configured to select the coefficient and the sampling frequency so that the digital filter functions as the digital low-pass filter, and supply the signal stored in the memory in the first period to the digital filter, in the second period.

11. The motor drive circuit according to claim 8, wherein the filter circuit includes:
    a digital filter configured to function as the digital notch filter or the digital low-pass filter;
    a selection circuit configured to select a coefficient, a sampling frequency, and an input signal of the digital filter in a time division manner; and
    a memory configured to store an output signal of the digital filter, wherein
the selection circuit is configured to select the coefficient and the sampling frequency so that the digital filter functions as the digital notch filter, and supply the target current signal to the digital filter, in the first period; and
the selection circuit is configured to select the coefficient and the sampling frequency so that the digital filter functions as the digital low-pass filter, and supply the signal stored in the memory in the first period to the digital filter, in the second period.

12. The motor drive circuit according to claim 1, wherein the filter circuit includes:
    a digital filter configured to function as the digital notch filter or the digital low-pass filter;
    a selection circuit configured to select a coefficient, a sampling frequency, and an input signal of the digital filter in a time division manner; and
    a memory configured to store an output signal of the digital filter, wherein
the selection circuit is configured to select the coefficient and the sampling frequency so that the digital filter functions as the digital notch filter, and supply the target current signal to the digital filter, in the first period; and
the selection circuit is configured to select the coefficient and the sampling frequency so that the digital filter functions as the digital low-pass filter, and supply the signal stored in the memory in the first period to the digital filter, in the second period.

* * * * *